(12) United States Patent
Iwamoto

(10) Patent No.: US 6,366,787 B1
(45) Date of Patent: Apr. 2, 2002

(54) CELLULAR TELEPHONE

(75) Inventor: Akira Iwamoto, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/289,978

(22) Filed: Apr. 13, 1999

(30) Foreign Application Priority Data

Jun. 11, 1998 (JP) ............................................ 10-163738

(51) Int. Cl.[7] ............................ H04Q 1/38; H04M 1/00
(52) U.S. Cl. ....................... 455/550; 455/428; 455/556; 455/557; 455/420
(58) Field of Search ................................. 455/550, 561, 455/575, 555, 557, 558, 553, 428, 420, 426, 556

(56) References Cited

U.S. PATENT DOCUMENTS

| | | | |
|---|---|---|---|
| 4,697,281 A | * 9/1987 | O'Sullivan | 379/59 |
| 4,912,756 A | * 3/1990 | Hop | 379/60 |
| 5,479,479 A | * 12/1995 | Braitberg et al. | 379/58 |
| 5,522,089 A | * 5/1996 | Kikinis et al. | 395/893 |
| 5,802,483 A | * 9/1998 | Morris | 455/557 |
| 5,903,849 A | * 5/1999 | Selin et al. | 455/557 |
| 5,826,198 A | * 10/1999 | Bergins et al. | 455/557 |

FOREIGN PATENT DOCUMENTS

JP          8-46566 A        2/1996

* cited by examiner

*Primary Examiner*—William Trost
*Assistant Examiner*—Marceau Milord
(74) *Attorney, Agent, or Firm*—Nixon & Vanderhye P.C.

(57) ABSTRACT

Providing a cellular telephone which does not use a digital cellular adapter and permits direct connection to an information processing apparatus for data communications. A serial data communication connection unit is directly connected to an information processing apparatus. A digital data communication processing unit interprets a command from the information processing apparatus for applying a control command to a controlling unit. Responding to the control command, the controlling unit controls a radio communication unit for issuing a call while controlling a switching unit for connection between the radio communication unit and the digital data communication processing unit thereby establishing a data communication channel. Communication data sent from the information processing apparatus is encoded by the digital data communication processing unit to be transmitted through the switching unit from the radio communication unit. Thus, the data communications are provided by directly connecting the cellular telephone to the information processing apparatus without using the digital cellular adapter.

25 Claims, 4 Drawing Sheets

CELLULAR TELEPHONE

BACKGROUND OF THE INVENTION

1. Field of the Invention

The present invention relates generally to a cellular telephone used singly or as connected to an information processing apparatus such as a personal computer, PDA (personal digital assistant) or the like, for transmission of data via a radio transmission channel.

2. Description of the Related Art

In Japanese Unexamined Patent Publication JP-A 8-46566(1996) is disclosed a data communication method wherein an information processing apparatus such as a notebook type personal computer is connected to a digital cellular telephone for data communications via a radio transmission channel.

Figure 4:
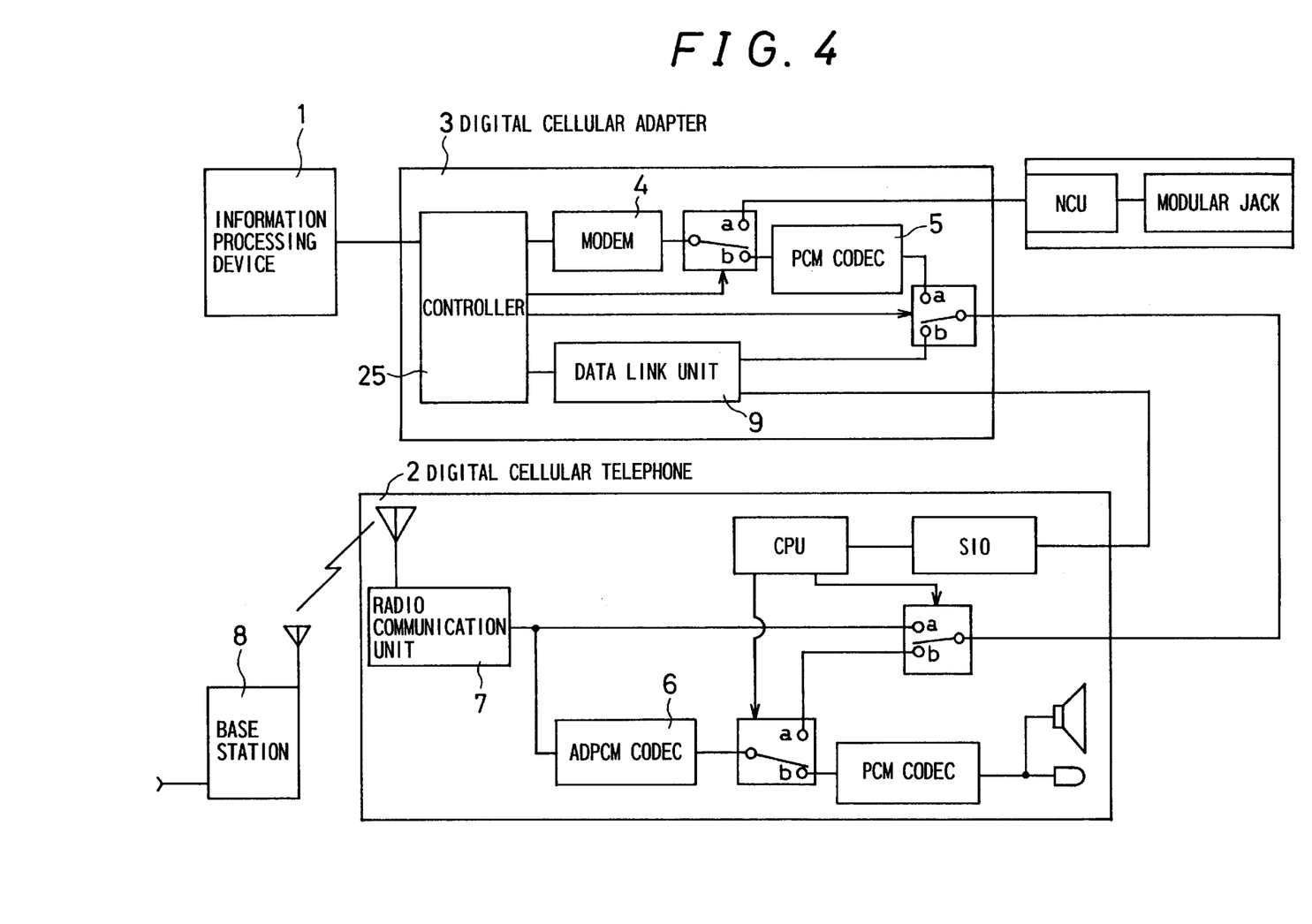
FIG. 4 is a block diagram showing a conventional connection between an information processing apparatus 1 and a digital cellular telephone 2.

FIG. 4 is a block diagram showing such a known connection between the information processing apparatus and the digital cellular telephone. An information processing apparatus 1 and a digital cellular telephone 2 are interconnected via a digital cellular adapter 3. The digital cellular adapter 3 is constructed as an IC card so as to be inserted in an IC card slot of the information processing apparatus 1 such as the notebook type personal computer to connect with the information processing apparatus 1.

The data communication by the digital cellular adapter 3 is performed in a voice band mode and a digital mode. In the case of the data communication in the voice band mode, a modem 4 incorporated in the digital cellular adapter 3 first converts a digital data signal from the information processing apparatus 1 into an analog signal which is converted again to a digital signal by a PCM codec 5. Thereafter, the digital signal is encoded by an ADPCM codec 6 incorporated in the digital cellular telephone 2 for data compression so that the compressed communication data is transmitted from a radio communication unit 7 to a base station 8 via a radio transmission channel. The digital cellular adapter 3 is controlled by a controller 25 interpreting commands from the information processing apparatus 1. A reversed procedure is taken for data reception.

In the case of the data communication in the digital mode wherein the digital data is not temporarily converted into the analog signal by the modem 4 as above-mentioned but transmitted as it is, the data is sent to the digital cellular telephone via a data link unit 9 incorporated in the digital cellular adapter 3. The data link unit 9 serves to encode/decode input/output communication data. The data link unit encodes the communication data inputted from the information processing unit 1 so as to send the coded data to the digital cellular telephone 2. The radio communication unit 7 of the digital cellular telephone 2 transmits the communication data to the base station 8 via the radio transmission channel. The digital cellular adapter 3 is controlled by the controller 25 interpreting the commands from the information processing apparatus 1. Received data is decoded by the data link unit 9 of the digital cellular adapter 3 before supplied to the information processing apparatus 1.

As discussed above, the prior-art digital cellular telephone 2 must be connected to the information processing unit 1 via the digital cellular adapter 3, and accordingly an independent digital cellular adapter is necessarily required to carry out data communication.

SUMMARY OF THE INVENTION

It is therefore, an object of the present invention to provide a cellular telephone permitting the direct connection to the information processing apparatus for data communications, thus dispensing with the digital cellular adapter.

The invention provides a cellular telephone comprising:
- a radio communication unit for carrying out radio communications with a base station;
- a serial data communication connection unit directly connected to an information processing apparatus, for transmitting/receiving a signal to/from the information processing apparatus; and
- a digital data communication processing unit for encoding/decoding input/output communication data and for interpreting a command from the information processing apparatus so as to apply the command to a controlling unit;
- a switching unit interposed between the radio communication unit and the digital data communication processing unit; and
- the controlling unit for controlling the radio communication unit and the switching unit based on the command interpreted by the digital data communication processing unit, thereby establishing a data communication channel.

According to the invention, the cellular telephone has the serial data communication connection unit connected to the information processing apparatus so that the cellular telephone transmits/receives the signal to/from the information processing apparatus via the serial data communication connection unit. The command outputted from the information processing apparatus is inputted in the digital data communication processing unit via the serial data communication connection unit. The digital data communication processing unit serves to interpret the command and to convert the command into an understandable form for the controlling unit prior to applying the command to the controlling unit. Responding to the instruction of the digital data communication processing unit, the controlling unit controls the radio communication unit for issuing a call for line request while controlling the switching unit for connection between the digital data communication processing unit and the radio communication unit and thus, the data communication channel is established. The digital data communication processing unit recognizes and encodes the communication data from the information processing apparatus for sending the coded data to the radio communication unit via the switching unit. The radio communication unit, in turn, transmits the communication data via a radio transmission channel established between the radio communication unit and the base station. On the other hand, communication data received by the radio communication unit via the radio transmission channel is decoded by the digital data communication processing unit and sent to the information processing apparatus via the serial data communication connection unit. Thus are provided the data communications between the information processing apparatus and the cellular telephone without the use of the digital cellular adapter.

The invention provides a cellular telephone comprising:
- a radio communication unit for carrying out radio communications with a base station;
- a first serial data communication connection unit directly connected to an information processing apparatus for transmitting/receiving a signal to/from the information processing apparatus;
- a digital data communication processing unit for encoding/decoding input/output communication data and for interpreting a command from the information processing apparatus so as to apply the command to a controlling unit;

a second serial data communication connection unit indirectly connected to the information processing apparatus via an adapter for encoding/decoding input/output communication data and for interpreting a command;

a data judging unit for determining whether the signal from the second serial data communication connection unit represents the command or the communication data and applying the command to the controlling unit but allowing the communication data to pass therethrough;

a switching unit connected to the radio communication unit, the digital data communication processing unit and the data judging unit; and the controlling unit for, when the information processing apparatus is directly connected to the first serial data communication connection unit, responding to the command from the digital data communication processing unit to control the radio communication unit and the switching unit for establishment of a data communication channel and for, when the information processing apparatus is connected to the second serial data communication connection unit via the adapter, responding to the command from the data judging unit to control the radio communication unit and the switching unit for establishment of the data communication channel.

According to the invention, the cellular telephone includes the two connection units, the first serial data communication connection unit and the second serial data communication connection unit, such that the information processing apparatus may be directly connected to the first serial data communication connection unit or indirectly connected to the second serial data communication connection unit via the adapter. Where the information processing apparatus is directly connected to the serial data communication connection unit, the digital data communication processing unit interprets the command from the information processing apparatus for conversion thereof into an understandable form for the controlling unit and inputs the converted command to the controlling unit. In response to the supplied command, the controlling unit controls the radio communication unit for issuing the call while controlling the switching unit for connection between the radio communication unit and the digital data communication processing unit, thereby establishing the data communication channel.

The digital data communication processing unit recognizes and encodes the communication data from the information processing apparatus so as to send the coded communication data to the radio communication unit via the switching unit. The radio communication unit, in turn, transmits the communication data to the base station via the radio transmission channel.

The communication data received by the radio communication unit is sent through the switching unit to the digital data communication processing unit in which the data is decoded to be sent to the information processing apparatus via the first serial data communication connection unit. Thus are provided the data communications without the use of the digital cellular adapter.

In the case where the information processing apparatus is connected to the second serial data communication connection unit via the adapter, the adapter interprets the control command outputted from the information processing apparatus for conversion thereof into the understandable form for the controlling unit and sends the converted command to the data judging unit via the second serial data communication connection unit. Determining the supplied signal to be the command for the controlling unit, the data judging unit sends the command to the controlling unit. In response to the command from the data judging unit, the controlling unit controls the radio communication unit for issuing the call while controlling the switching unit for connection between the data judging unit and the radio communication unit thereby establishing the data communication channel. Determining the signal from the second serial data communication connection unit to be the communication data, the data judging unit permits the communication data to pass therethrough so that the communication data sends through the switching unit to the radio communication unit. The radio communication unit, in turn, transmits the communication data to the base station via the radio transmission channel established therebetween. The communication data received by the radio communication unit is sent to the adapter via the switching unit, the data judging unit and the second serial data communication connection unit. The adapter, in turn, decodes the data and sends the resultant data to the information processing apparatus. In summary, when the information processing apparatus is connected to the cellular telephone for data communications, there are provided two optional ways to carry out the data communications: to use the data communication function incorporated in the cellular telephone, such as the digital data communication processing unit and to use the adapter.

The invention provides a cellular telephone comprising:

a radio communication unit for carrying out radio communications with a base station;

a serial data communication connection unit directly connected to an information processing apparatus or indirectly connected to the information processing apparatus via an adapter for encoding/decoding input/output communication data and interpreting a command;

a data analyzing unit for analyzing a signal from the serial data communication connection unit for determining whether the signal is directly inputted from the information processing apparatus or indirectly inputted therefrom via said adapter and further determining whether the inputted signal represents the command or the communication data so as to apply the command to the controlling unit and to allow the communication data to pass therethrough;

a digital data communication processing unit for encoding/decoding the input/output communication data and interpreting the command so as to apply the command to a controlling unit;

a first switching unit connected to the radio communication unit;

a second switching unit connected to the first switching unit, the digital data communication processing unit, and the data analyzing unit; and the controlling unit for, when the signal subjected to the data analyzing unit is determined to be the direct input from the information processing apparatus, responding to the command interpreted by the data analyzing unit to control the second switching unit for connection between the digital data communication processing unit and the data analyzing unit while responding to the command interpreted by the digital data communication processing unit to control the radio communication unit and the first switching unit for establishment of a data communication channel and for, when the signal subjected to the data analyzing unit is determined to be the indirect input via the adapter, responding to the command from the data analyzing unit to control the radio communication unit, the first switching unit and the second switching unit for direct connection between the first switching unit and the second switching unit thereby establishing a data communication channel.

According to the invention, the serial data communication connection unit is adapted for the direct connection to the information processing apparatus or for the indirect connection thereto via the adapter. The command outputted from the information processing apparatus passes through the serial data communication connection unit to reach the data analyzing unit. In the case of the command sent via the adapter, the data analyzing unit recognizes such a command and inputs to the controlling unit a command to control the second switching unit for connection between the data analyzing unit and the first switching unit. Immediately thereafter, the data analyzing unit supplies the controlling unit with the command sent thereto via the adapter. In response to the command sent thereto via the data analyzing unit, the controlling unit controls the radio communication unit for issuing the call while controlling the first switching unit for connection between the second switching unit and the radio communication unit, thereby establishing the data communication channel. Recognizing the communication data sent thereto via the adapter, the data analyzing unit allows the communication data to pass therethrough so that the data reaches the radio communication unit. The radio communication unit, in turn, transmits the communication data to the base station via the radio transmission channel established therebetween. The communication data received by the radio communication unit is sent to the adapter via the first switching unit, the second switching unit, the data analyzing unit and the serial data communication connection unit so that the adapter decodes the supplied data to send the resultant data to the information processing apparatus. The data communications via the adapter are carried out in this manner.

When recognizing that the signal from the serial data communication connection unit is the direct input from the information processing apparatus, the data analyzing unit inputs into the controlling unit a command to control the second switching unit for connection between the data analyzing unit and the digital data communication processing unit. Immediately thereafter, the data analyzing unit sends the incoming command to the digital data communication processing unit via the second switching unit. The digital data communication processing unit interprets the supplied control command for conversion thereof into the understandable form for the controlling unit and then, inputs the resultant command to the controlling unit. In response to the command from the digital data communication processing unit, the controlling unit controls the radio communication unit for issuing the call while controlling the first switching unit for connection between the digital data communication processing unit and the radio communication unit, thereby establishing the data communication channel. The communication data outputted from the information processing apparatus is sequentially applied to the serial data communication connection unit, the data analyzing unit, the second switching unit and the digital data communication connection unit in which the data is encoded. The resultant data is sent via the first switching unit to the radio communication unit for transmission therefrom.

The communication data received by the radio communication unit is sent via a reversed course to the above and is decoded by the digital data communication processing unit before applied to the information processing apparatus. In summary, when the cellular telephone is connected to the information processing apparatus for data communications, the cellular telephone, in direct connection to the information processing apparatus or indirect connection thereto via the adapter, is adapted to carry out the data communications based on determination automatically and internally made as to whether the signal is the direct input from the information processing apparatus or the indirect input via the adapter. With only one connection port, the cellular telephone prevents the user from mistakenly connecting the cellular telephone with the information processing apparatus.

In the invention it is preferable that the cellular telephone comprises:

an operation unit for inputting a voice communication control signal in a controlling unit based on an operation by a user;

a voice input/output unit for carrying out voice communications; and a conversion unit interposed between the voice input/output unit and the switching unit and performing digital/analog conversion or analog/digital conversion on a signal to be inputted/outputted, and the controlling unit responds to the voice communication control signal inputted from the operation unit to control the radio communication unit and the switching unit for establishment of a voice communication channel, and responds to the command from the digital data communication processing unit to establish the data communication channel and then sustaining the data communication channel during the establishment thereof, despite the input from the operation unit.

According to the invention, when the user manipulates the operation unit for inputting the voice communication control signal in the controlling unit, the controlling unit controls the radio communication unit for issuing the call while controlling the switching unit for connection between the radio communication unit and the conversion unit, thereby establishing the voice communication channel. Voice inputted in the voice input/output unit is converted into a digital signal by the conversion unit so as to be transmitted through the switching unit from the radio communication unit. A voice communication signal received by the radio communication unit is applied to the conversion unit via the switching unit and then converted into an analog signal to be outputted as voice from the voice input/output unit.

Receiving the command from the information processing apparatus via the digital data communication processing unit, the controlling unit controls the switching unit for connection between the radio communication unit and the digital data communication processing unit thereby to establish the data communication channel over which the data communications are carried out. During the establishment of the data communication channel, the controlling unit sustains the data communication channel despite the input from the operation unit. Hence, the controlling unit does not respond to the accidental key-in through the operation unit by the user, permitting the data communications to proceed normally. In addition, when the information processing apparatus connected to the cellular telephone starts the data communications, the data communication channel is automatically established for data communications. This negates the need for the user to make settings of both the information processing apparatus and the cellular telephone and hence, the communications are prevented from being disabled by an erroneous setting of either one of the above.

In the invention it is preferable that the cellular telephone comprises:
- an operation unit for inputting a voice communication control signal in the controlling unit based on an operation by a user;
- a voice input/output unit for carrying out voice communications; and
- a conversion unit interposed between the voice input/output unit and the first switching unit and performing digital/analog conversion or analog/digital conversion on a signal to be inputted/outputted, and
- the controlling unit responds to the voice communication control signal inputted from the operation unit to control the radio communication unit and the first switching unit for establishment of a voice communication channel, and
- responds to the command from the digital data communication processing unit or the data judging unit to establish the data communication channel and then sustains the data communication channel during the establishment thereof, despite the input from the operation unit.

According to the invention, when the user manipulates the operation unit for applying the voice communication control signal to the controlling unit, the controlling unit controls the radio communication unit for issuing the call while controlling the switching unit for connection between the radio communication unit and the conversion unit, thereby establishing the voice communication channel. The voice inputted through the voice input/output unit is converted into the digital signal by the conversion unit so as to be transmitted through the switching unit from the radio communication unit. The signal received by the radio communication unit is sent through the switching unit to the conversion unit, in which the signal is converted into the analog signal to be outputted as voice from the voice input/output unit.

Receiving the command from the information processing apparatus via the first serial data communication connection unit or the second serial data communication connection unit, the controlling unit controls the radio communication unit and the switching unit for establishment of the data communication channel over which the data communications are carried out. Inasmuch as the controlling unit sustains the data communication channel during the establishment thereof despite the input from the operation unit, the accidental key-in through the operation unit is not responded during the data communications so that the data communications are permitted to proceed normally. In addition, the data communication channel is automatically established when the information processing apparatus starts the data communications. This negates the need for the user to make settings of both the information processing apparatus and the cellular telephone and hence, the data communications are prevented from being disabled by an erroneous setting of either one of the above.

In the invention it is preferable that the cellular telephone comprises:
- an operation unit for inputting a voice communication control signal in the controlling unit based on an operation by a user;
- a voice input/output unit for carrying out voice communications; and
- a conversion unit interposed between the voice input/output unit and the first switching unit, for performing digital/analog conversion or analog/digital conversion on a signal to be inputted/outputted, and
- the controlling unit responds to the voice communication control signal inputted from the operation unit to control the radio communication unit and the first switching unit for establishment of a voice communication channel, and
- responds to the command from the data analyzing unit or the digital data communication processing unit to control the radio communication unit, the first switching unit and the second switching unit to establish the data communication channel, and then sustains the data communication channel during the establishment thereof despite the input from the operation unit.

According to the invention, when the user manipulates the operation unit for applying the voice communication control signal to the controlling unit, the controlling unit controls the radio communication unit for issuing the call while controlling the switching unit for connection between the radio communication unit and the conversion unit, thereby establishing the voice communication channel. The signal inputted from the voice input/output unit is converted into the digital signal by the conversion unit so as to be transmitted through the switching unit from the radio communication unit. The signal received by the radio communication unit is converted into the analog signal by the conversion unit so as to be outputted as voice from the voice input/output unit. The voice communications are carried out in this manner.

When the information processing apparatus, directly connected to the serial data communication connection unit or indirectly connected thereto via the adapter, inputs the command to the controlling unit, the controlling unit establishes the data communication channel over which the data communications are carried out. That is, the voice communications take place based on the instructions from the controlling unit during the voice communications but the communication channels are automatically switched based on the instruction from the information processing apparatus which starts the data communications. Accordingly, the controlling unit does not respond to the accidental key-in through the operation unit during the data communications, thus permitting the data communications to proceed normally.

In addition, the data communication channel is automatically established when the information processing apparatus starts the data communications. This negates the need for the user to make settings of both the information processing apparatus and the cellular telephone and hence, the data communications are prevented from being disabled by an erroneous setting of either one of the above.

In the invention it is preferable that the cellular telephone comprises:
- an preference operation unit for inputting a priority signal in the controlling unit in response to an operation by a user, and
- the controlling unit responds to the inputted priority signal to establish the voice communication channel based on the voice communication control signal from the operation unit, despite the command supplied thereto.

According to the invention, when the preference operation unit is operated for applying the priority signal to the controlling unit during the data communications, the controlling unit responds to the voice communication signal from the operation unit rather than to the command from the information processing apparatus, so as to control the radio communication unit and the switching unit for establishment of the voice communication channel. This permits the cellular telephone to be promptly shifted to the voice communication mode when, for example, an urgent need for the voice communications arises during the data communications.

As discussed above, the cellular telephone according to the invention incorporates therein the digital data communication processing unit serving to interpret the command signal from the information processing apparatus as well as to encode/decode the communication data. Thus, the cellular telephone of the invention is adapted for the data communications through direct connection to the information processing apparatus, or without using the digital cellular adapter.

Further, the cellular telephone according to the invention is adapted to carry out the data communications through direct connection between the first serial data communication connection unit and the information processing apparatus as well as through indirect connection between the second serial data communication connection unit and the information processing apparatus via the digital cellular adapter. That is, the cellular telephone supports the data communications not only through the direct connection to the information processing apparatus but also through the indirect connection thereto via the digital cellular adapter. Hence, the cellular telephone of the invention is prepared for a future case where a more advanced and sophisticated digital cellular adapter is provided or where the data communication standards are changed to produce need for replacing the digital cellular adapter with that complying with the changed standards. Even in such cases, the cellular telephone still can support the data communications by only indirectly connecting the information processing apparatus to the main body of the telephone just as it is via the digital cellular adapter.

Further, the cellular telephone according to the invention includes one serial data communication connection unit which may be directly connected to the information processing apparatus or indirectly connected thereto via the adapter for carrying out the data communications. The provision of one serial data communication connection unit is effective to prevent the erroneous connection of the information processing apparatus. In addition, permitting not only the direct connection to the information processing apparatus but also the indirect connection thereto via the adapter, the main body of the cellular telephone, in the as-is state, will still be able to support the data communications at some future time when the more advanced digital cellular adapter is provided or when the data communication standards are changed to require replacement by a digital cellular adapter complying with the changed standards.

The cellular telephone according to the invention is adapted to carry out the voice communications via the voice communication channel established by the operation through the operation unit in the case of the voice communication, and also to carry out the data communications as automatically switched in operations by the command signal from the information processing apparatus connected to the cellular telephone in the case of the data communication. While the data communications take place, the controlling unit sustains the data communications despite the input from the operation unit. Thus, the accidental key-in through the operation unit is not responded during the data communications so that the data communications may proceed normally. In addition, the operations of the cellular telephone are automatically switched based on the command from the information processing apparatus so that the need for the user to make settings of both the cellular telephone and the information processing apparatus is dispensed with. This is effective to prevent the communications from being disabled by the erroneous setting of either one of the above.

Furthermore, the cellular telephone according to the invention permits the voice communications when the urgent need therefor arises during the data communications, the voice communications enabled by inputting the voice communication control signal in the controlling unit from the operation unit through operation of the preference operation unit.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Now referring to the drawings, preferred embodiments of the invention are described below.

Figure 1:
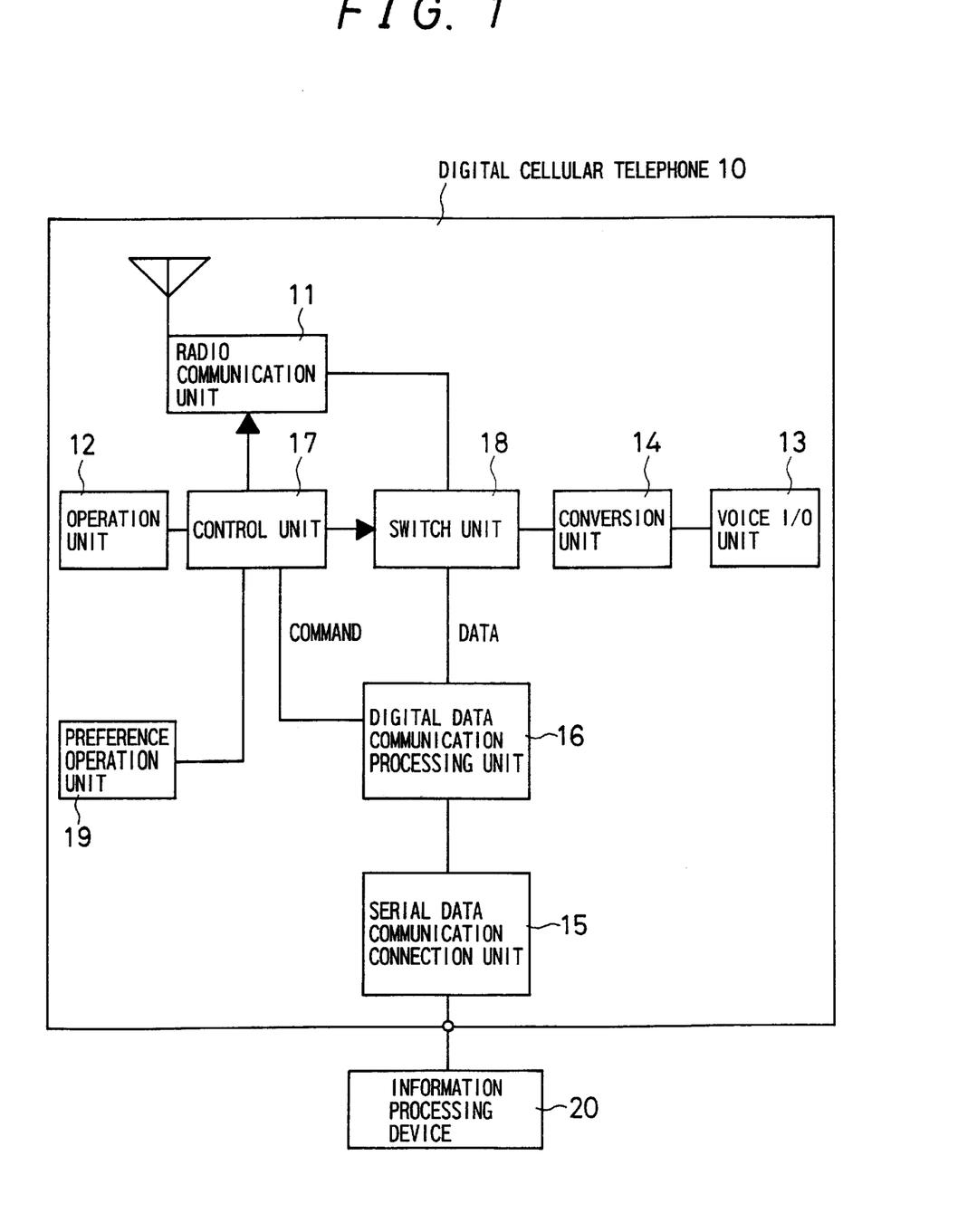
FIG. 1 is a block diagram showing a construction of a digital cellular telephone 10 according to an embodiment of the present invention.

FIG. 1 is a block diagram showing a construction of a digital cellular telephone 10 according to an embodiment of the present invention. In this embodiment, the digital cellular telephone 10 is directly connected to an information processing apparatus 20 such as a notebook type personal computer, PDA or the like.

The digital cellular telephone 10 includes a radio communication unit 11 for carrying out radio communications with a base station, a serial data communication connection unit 15 directly connected to the information processing apparatus 20, a digital data communication processing unit 16 connected to the serial data communication connection unit 15, and a switching unit 18 interposed between the radio communication unit 11 and the digital data communication processing unit 16. The switching unit 18 is connected to a voice I/O unit 13 via a conversion unit 14. A controlling unit 17 for controlling the switching unit 18 and the radio communication unit 11 is connected to an operation unit 12 permitting a user to manipulate a dial, the digital data communication processing unit 16 and a preference operation unit 19. Based on control signals from these units, the controlling unit controls the radio communication unit 11 and the switching unit 18.

The serial data communication connection unit 15 is connected to a serial interface connector of the information processing apparatus 20 via a cable and is responsible for signal transmission/reception between the digital cellular telephone 10 and the information processing apparatus 20. The digital data communication processing unit 16 performs coding of communication data for compressing the communication data inputted from the information processing apparatus 20 via the serial data communication connection unit. The digital data communication processing unit also serves to decode received communication data before applying the data to the information processing apparatus 20. Further, the digital data communication processing unit interprets an AT command, which is sent from the information processing apparatus 20 and used for controlling a modem, so as to convert, as required, the command to a control command in a form understandable for the controlling unit 17, before inputting the control command to the controlling unit 17.

In response to the control signal from the controlling unit, the radio communication unit 11 issues a call for line request and carries out radio communications with the base station via a radio transmission channel established therebetween. Communication data from the information processing apparatus 20 and voice communication signal from the voice I/O unit are digitally modulated by the radio communication unit 11 before being transmitted. On the other hand, received communication data and voice communication signal are digitally modulated to be sent to the information processing apparatus 20 and the voice I/O unit 13, respectively.

The voice I/O unit 13 includes a microphone and speaker. The conversion unit 14 performs digital/analog conversion and analog/digital conversion. Since voice inputted through the microphone of the voice I/O unit 13 is an analog signal, the signal is digitally converted by the conversion unit 14 and then encoded to be supplied to the radio communication unit 11 for transmission. Voice communication data received by the radio communication unit 11 is decoded and then inputted in the conversion unit 14 so as to be converted into the analog signal, which is outputted as voice by the speaker of the voice I/O unit 13. The coding/decoding operations of the voice communication data are performed by the digital data communication processing unit 16 as switched by the switching unit 18.

Next, operations of the embodiment will be described. The switching unit 18 normally interconnects the radio communication unit 11 and the conversion unit 14. The controlling unit 17 is normally in a voice communication mode to be ready for receiving the input from the operation unit 12. The digital data communication processing unit 16 is normally in a command mode to be ready for receiving the AT command. When the information processing apparatus 20 is connected and outputs the AT command, the AT command is sent through the serial data communication connection unit 15 to the digital data communication processing unit 16 having an equivalent function to the digital cellular adapter. The digital data communication processing unit 16, which is initially in the command mode, interprets the AT command to return a command echo or a result code to the information processing apparatus 20, as required. If the AT command requests for a line connection, the digital data communication processing unit 16 converts the AT command into a control command for line connection request in an understandable form for the controlling unit 17 before applying the control command to the controlling unit 17. The input of the control command to the controlling unit 17 shifts the digital cellular telephone 10 from the voice communication mode to a data communication mode in which the controlling unit 17 does not respond to the input from the operation unit 12.

Based on the control command inputted by the digital data communication processing unit 16, the controlling unit 17 controls the radio communication unit 11 for issuing the call for line request while controlling the switching unit 18 for connection between the digital data communication processing unit 16 and the radio communication unit 11 thereby establishing a data communication channel. Subsequent to the establishment of the data communication channel and the line connection completion, the digital data communication processing unit 16 sends the result code to the information processing apparatus 20 so as to be shifted from the command mode to the data communication mode. The information processing apparatus 20, in turn, starts transmitting data after receipt of the result code indicative of the successful line connection.

The communication data transmitted from the information processing apparatus 20 is sent to the digital data communication processing unit 16 via the serial data communication connection unit 15. The communication data is encoded by the digital data communication processing unit 16, which is in the data communications mode. Subsequently, the coded communication data is sent through the switching unit 18 to the radio communication unit 11 which transmits the communication data. Inversely, communication data received by the radio communication unit is sent through the switching unit 18 to the digital data communication processing unit 16 which, in turn, serves to decode the data. The decoded data is sent to the information processing apparatus 20 via the serial data communication connection unit 15.

In response to a command to terminate the data communications, the controlling unit 17 automatically controls the switching unit 18 for connection between the radio communication unit 11 and the conversion unit 14 so that the digital cellular telephone 10 is shifted to the voice communication mode. In this manner, the data communications between the digital cellular telephone 10 and the information processing apparatus 20 are provided without relying on the digital cellular adapter.

Next, description will be made on the voice communication mode. When the operation unit 12 responds to a dialing operation by the user to apply a voice communication control signal to the controlling unit 17, the controlling unit 17 controls the radio communication unit 11 for issuing the call while controlling the switching unit 18 for connection between the radio communication unit 11 and the conversion unit 14. Thus, a voice communication channel is established. The voice inputted through the microphone of the voice I/O unit 13 is digitally converted to be transmitted by the radio communication unit. Inversely, the voice communication signal received by the radio communication unit is converted into the analog signal to be outputted as the voice by the voice I/O unit 13. The voice communications take place in this manner.

The cellular telephone 10 is normally in the voice communication mode but is shifted to the data communication mode by inputting the control command from the information processing apparatus 20. During the establishment of the data communication channel, the controlling unit 17 is disabled for response to the input from the operation unit 12 thereby sustaining the data communication channel. Accordingly, the data communications are permitted to proceed normally despite an accidental key-in through the operation unit 12 during the data communications.

Furthermore, the cellular telephone is automatically switched to the data communication mode at the time when the information processing apparatus 20 starts the data communications. This negates the need for the user to make settings of both the information processing apparatus 20 and the cellular telephone 10 and hence, the communications are prevented from being disabled by an erroneous setting of either one of the above.

In a case where an urgent need for voice communications arises during the data communications, the preference operation unit 19 is manipulated for applying a priority signal to the controlling unit 17. Inputting the priority signal shifts the cellular telephone to the voice communication mode such that the controlling unit 17 responds to the voice communication control signal from the operation unit 12 to control the radio communication unit 11 and the switching unit 16 for establishment of the voice communication channel. Thus, when the urgent need for the voice communications arises during the data communications, the voice communications are enabled by operating the preference operation unit 19 for shifting the cellular telephone from the data communication mode to the voice communication mode.

Figure 2:
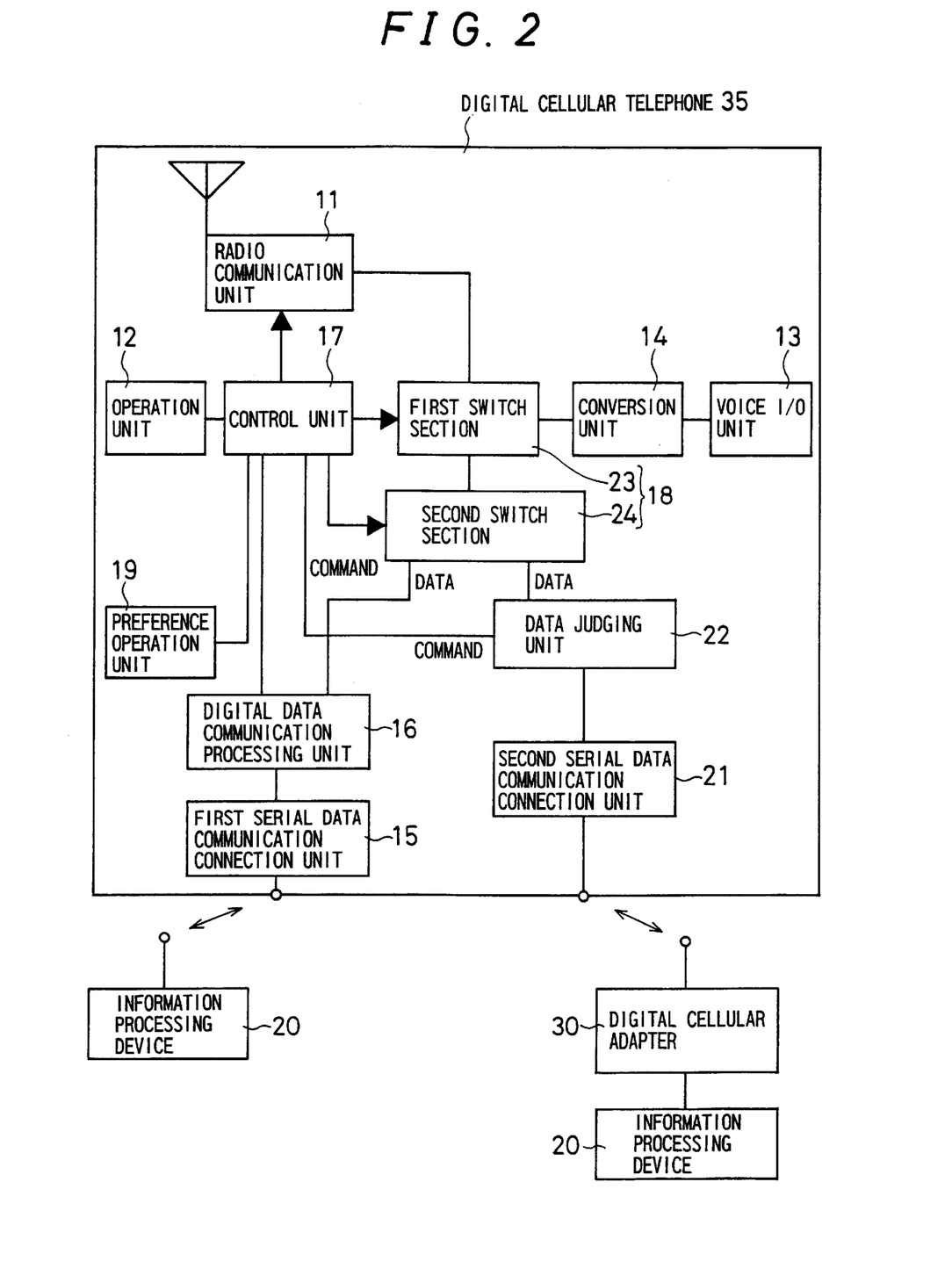
FIG. 2 is a block diagram showing a construction of a digital cellular telephone 35 according to another embodiment of the invention.

FIG. 2 is a block diagram showing a construction of a digital cellular telephone 35 according to another embodiment of the invention. It is to be noted that like components to those of the digital cellular telephone 10 shown in FIG. 1 are represented by like numerals, respectively and the description thereof is omitted. The digital cellular telephone 35 of this embodiment includes two connectors: the first serial data communication connection unit 15 and a second serial data communication connection unit 21. That is, the digital cellular telephone 35 is adapted for two ways of connections to the information processing apparatus 20: a direct connection between the first serial data communication connection unit 15 and the information processing apparatus 20, and an indirect connection between the second serial data communication connection unit 21 and the information processing apparatus 20 via a digital cellular adapter 30. The digital cellular adapter 30 serves to interpret the AT command from the information processing apparatus 20 for conversion into the understandable control command for the controlling unit 17 as well as to encode/decode the input/output communication data.

The switching unit 18 of the digital cellular telephone 35 includes a first switch section 23 and a second switch section 24 which are controlled by the controlling unit 17, respectively. Interposed between the second serial data communication connection unit 21 and the second switch section 24 is a data judging unit 22 which is connected to the controlling unit 17, as well. The second switch section 24 is connected to the digital data communication processing unit 16 connected with the first serial data communication connection unit 15 as well as to the first switch section 23. On the other hand, the first switch section 23 is connected to the radio communication unit 11 as well as to the conversion unit 14.

The digital cellular adapter 30 is of an IC card configuration, for example, to be inserted in an IC slot of the information processing apparatus 20, such as the notebook type personal computer, for connection therewith.

The data judging unit 22 determines whether the signal sent from the information processing apparatus 20 via the second serial data communication connection unit 21 represents the communication data or the control command, sending the control command to the controlling unit 17 while allowing the communication data to pass therethrough to reach the second switch section 24.

Next, operations of the digital cellular telephone 35 will be described. In a case where the information processing apparatus 20 is directly connected to the first serial data communication connection unit 15, the AT command is interpreted by the digital data communication processing unit 16, similarly to the aforementioned digital cellular telephone 10, so that the controlling unit 17 controls the radio communication unit 11 for issuing the call. At the same time, the controlling unit controls the first switch section 23 for connection between the radio communication unit 11 and the second switch section 24 and also controls the second switch section 24 for connection between the first switch section 23 and the digital data communication processing unit 16. Thus is established the data communication channel over which the data communications are carried out.

In a case where the second serial data communication connection unit 21 is connected to the information processing apparatus 20 via the digital cellular adapter 30, the AT command from the information processing apparatus 20 is interpreted by the digital cellular adapter 30 which returns the command echo or result code to the information processing apparatus 20 as required. If the AT command requests for the line connection, the digital cellular adapter converts the command to an understandable form for the controlling unit 17 before sending the command to the data judging unit 22. The data judging unit 22 determines whether the signal from the second serial data communication connection unit 21 is the control command or not. When determining the signal to be the control command, the judging unit sends the control command to the controlling unit 17. When determining the signal not to be the control command, the judging unit allows the data as the communication data to pass therethrough to reach the second switch section 24. The control command thus categorized by data judging unit 22 is applied to the controlling unit 17. Based on the control command, the controlling unit 17 controls the radio communication unit 11 for issuing the call while controlling the first switch section 23 of the switching unit 18 for connection between the radio communication unit 11 and the second switch section 24, which is controlled for connection between the first switch section 23 and the data judging unit 22. Thus, the data communication channel is established.

When the control command indicative of the line connection completion is sent from the controlling unit 17 to the digital cellular adapter 30 through the data judging unit 22 and the second serial data communication connection unit 21, the digital cellular adapter 30 returns the result code to the information processing apparatus 20. Subsequently, the information processing apparatus 20 carries out the data communications by way of the digital cellular adapter 30, the second serial data communication connection unit 21, the data judging unit 22, the second switch section 24, the first switch section 23 and the radio communication unit 11.

On the other hand, the voice communications are carried out after the voice communication channel is established by manipulating the operation unit 12. When the data communications are carried out, the operation is automatically switched by sending the signal from the information processing apparatus 20. Similarly to the digital cellular telephone 10, the data communications are sustained despite the accidental key-in through the operation unit 12. When the urgent need for the voice communications arises during the data communications, the cellular telephone is shifted to the voice communication mode by applying the priority signal to the controlling unit 17 through the preference operation unit 19, in which mode the voice communications are carried out.

Figure 3:
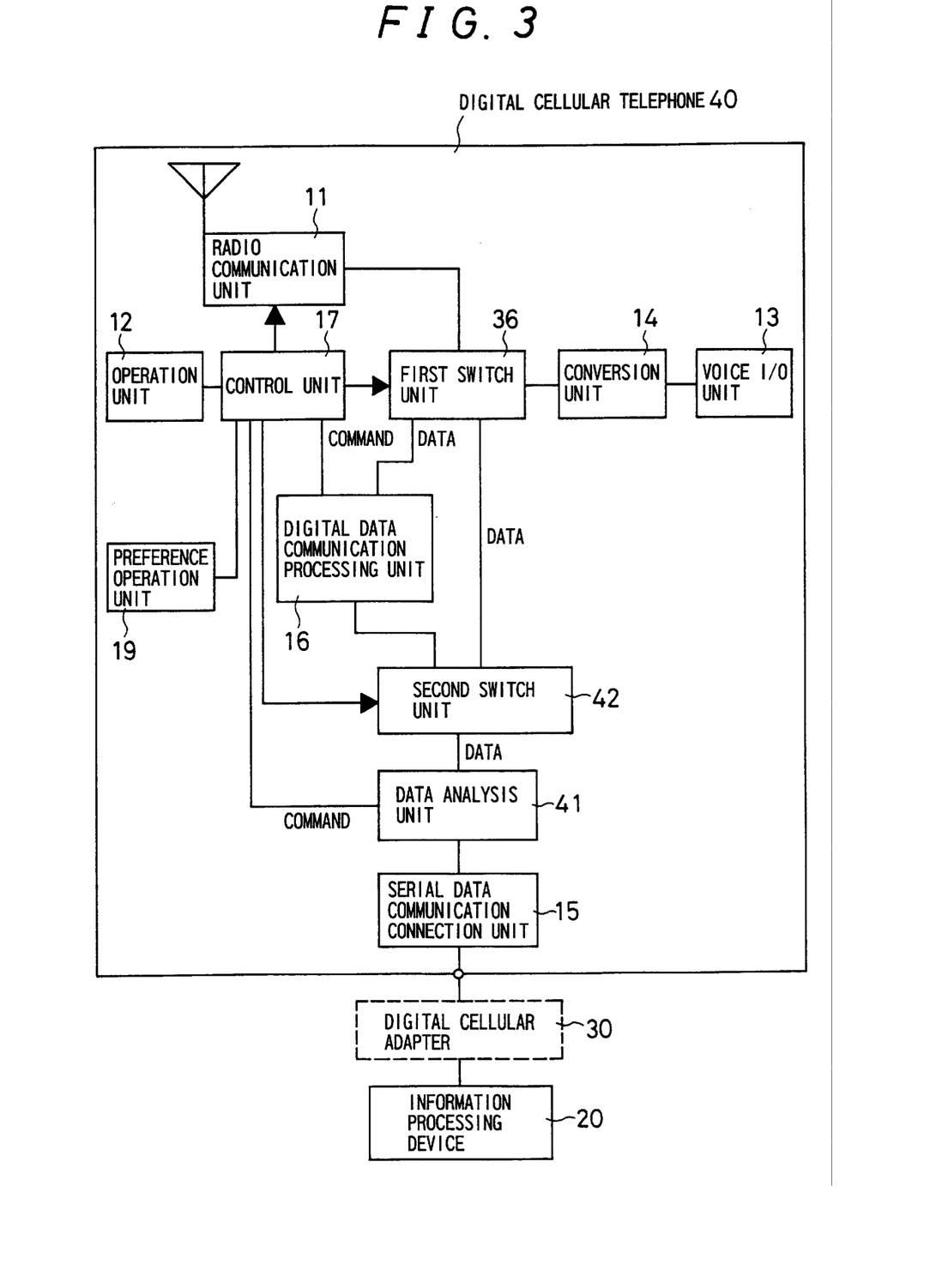
FIG. 3 is a block diagram showing a construction of a digital cellular telephone 40 according to still another embodiment of the invention.

FIG. 3 is a block diagram showing a construction of a digital cellular telephone 40 according to still another embodiment of the invention. It is to be noted that like components to those of the digital cellular telephones 10, 35 shown in FIG. 1 or 2 are represented by like numerals, respectively, and the description thereof is omitted. The digital cellular telephone 40 includes one serial data communication connection unit 15 which is directly connected to the information processing apparatus 20 or indirectly connected thereto via the digital cellular adapter 30.

The serial data communication connection unit 15 is connected to a data analyzing unit 41 which is connected to the controlling unit 17 and also to a second switching unit 42. The second switching unit 42 is connected to the digital data communication processing unit 16 and to a first switching unit 36, and is controlled by the controlling unit 17. The first switching unit 36 is connected to the digital data communication processing unit 16, the second switching unit 42, the conversion unit 14 and the radio communication unit 11, and is controlled by the controlling unit 17. The data analyzing unit 41 analyzes the signal inputted from the serial data communication connection unit 15 to determine whether the signal is a direct input from the information processing apparatus 20 or an indirect input via the digital cellular adapter 30. The data analyzing unit 41 further determines the inputted signal to be the AT command, the control command or others.

Next, operations of the digital cellular telephone 40 in this embodiment will be described. In a case where the digital cellular telephone 40 is directly connected to the information processing apparatus 20 without using the digital cellular adapter 30, the AT command outputted from the information processing apparatus 20 passes through the serial data communication connection unit 15 to reach the data analyzing unit 41. Upon recognition of the AT command, the digital analyzing unit 41 sends to the controlling unit 17 a control command directing the second switching unit to interconnect the data analyzing unit 41 and the digital data communication processing unit 16. Subsequent to the completion of the switching operation by the second switching unit 42, the data analyzing unit 41 sends the AT command to the digital data communication processing unit 16 via the second switching unit 42. The digital data communication processing unit 16 is initially in the command mode in which the digital data communication processing unit interprets the AT command to return the command echo or result code to the information processing apparatus 20 as required. If the AT command requests for the line connection, the digital data communication processing unit 16 sends to the controlling unit 17 a control command for requesting the line connection. Responding to the control command from the digital data communication processing unit 16, the controlling unit 17 controls the radio communication unit 11 for issuing the call while controlling the first switching unit 36 for connection between the digital data communication processing unit 16 and the radio communication unit 11 thereby establishing the data communication channel. Subsequent to the line connection completion, the digital data communication processing unit 16 sends the result code to the information processing apparatus 20, thus shifting from the command mode to the data communication mode. Upon receipt of the result code, the data processing apparatus 20 starts the data communications by way of the serial data communication connection unit 15, the data analyzing unit 41, the second switching unit 42, the digital data communication processing unit 16, the first switching unit 36 and the radio communication unit 11.

In a case where the digital cellular telephone 40 is indirectly connected to the information processing apparatus 20 via the digital cellular adapter 30, the digital cellular adapter 30 interprets the AT command outputted from the information processing apparatus 20 and returns the command echo or result code to the information processing apparatus 20 as required. If the AT commands request for the line connection, the digital cellular adapter passes the control command for line connection request to the data analyzing unit 41 via the serial data communication connection unit 15. Recognizing the control command, the data analyzing unit 41 sends the control command to the controlling unit 17. Based on the control command, the controlling unit 17 control the second switching unit 42 for connection between the first switching unit 36 and the data analyzing unit 41. Subsequently, the data analyzing unit 41 sends a control command to the controlling unit 17 which, based on the control command thus applied, controls the radio communication unit 11 for issuing the call and also controls the first switching unit 36 for connection between the second switching unit 42 and the radio communication unit 11. Thus, the data communication channel is established.

Upon completion of the line connection, the controlling unit 17 reports the line connection completion to the digital cellular adapter 30 via the data analyzing unit 41 and the serial data communication connection unit 15. When the digital cellular adapter 30 sends the result code indicative of the line connection completion to the information processing apparatus 20, the data communications take place by way of the information processing apparatus 20, the digital cellular adapter 30, the serial data communication connection unit 15, the data analyzing unit 41, the second switching unit 42, the first switching unit 36 and the radio communication unit 11.

The serial data communication connection unit 15 for connection may only include one connector to serve in both cases: the direct connection between the information processing apparatus 20 and the digital cellular telephone 40, and the indirect connection therebetween via the digital cellular adapter 30. When the cellular telephone is directly connected to the information processing apparatus or when the telephone is indirectly connected to the information processing apparatus via the digital cellular adapter 30, the data analyzing unit 41 determines the signal from the information processing apparatus 20 so that the operations of the telephone are automatically switched. This negates the need for making settings of both the digital cellular telephone 40 and the information processing apparatus 20. As a result, the data communications are prevented from being disabled by the erroneous setting.

For the voice communications, the operation unit 12 may be manipulated for establishing the voice communication channel over which the voice communications are carried out. The controlling unit 17 is adapted to ignore the voice communication control signal from the operation unit 12 during the data communications and therefore, the data communications are prevented from being interrupted despite the accidental key-in through the operation unit 12 during the data communications. When the urgent need for the voice communications arises during the data communications, the preference operation unit 19 may be operated to direct the controlling unit 17 to accept the voice communication control signal inputted from the operation unit 12.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A cellular telephone comprising:

a radio communication unit for carrying out radio communications with a base station;

a serial data communication connection unit directly connected to an information processing apparatus, for transmitting/receiving a signal to/from the information processing apparatus;

a controlling unit;

a digital data communication processing unit for encoding/decoding input/output communication data and for interpreting a command from the information processing apparatus into a command recognizable by the controlling unit; and a switching unit interposed between the radio communication unit and the digital data communication processing unit, wherein the controlling unit controls the radio communication unit and the switching unit and is responsive to the command interpreted by the digital data communication processing unit to control the radio communication unit to issue a call for line request, and wherein the digital data communication processing unit provides a result code indicative of successful line connection to the information processing device, thereby establishing a data communication channel between the radio communication unit and the information processing device via a communication path including the serial data communication connection unit, the digital data communication processing unit, and the switching unit.

2. A cellular telephone comprising:

a radio communication unit for carrying out radio communications with a base station;

a first serial data communication connection unit directly connected to an information processing apparatus for transmitting/receiving a signal to/from the information processing apparatus;

a digital data communication processing unit for encoding/decoding input/output communication data and for interpreting a command from the information processing apparatus so as to apply the command to a controlling unit;

a second serial data communication connection unit indirectly connected to the information processing apparatus via an adapter for encoding/decoding input/output communication data and for interpreting a command;

a data judging unit for determining whether the signal from the second serial data communication connection unit represents the command or the communication data and applying the command to the controlling unit but allowing the communication data to pass therethrough;

a switching unit connected to the radio communication unit, the digital data communication processing unit and the data judging unit; and the controlling unit for, when the information processing apparatus is directly connected to the first serial data communication connection unit, responding to the command from the digital data communication processing unit to control the radio communication unit and the switching unit for establishment of a data communication channel and for, when the information processing apparatus is connected to the second serial data communication connection unit via the adapter, responding to the command from the data judging unit to control the radio communication unit and the switching unit for establishment of the data communication channel.

3. A cellular telephone comprising:

a radio communication unit for carrying out radio communications with a base station;

a serial data communication connection unit directly connected to an information processing apparatus or indirectly connected to the information processing apparatus via an adapter for encoding/decoding input/output communication data and interpreting a command;

a data analyzing unit for analyzing a signal from the serial data communication connection unit for determining whether the signal is directly inputted from the information processing apparatus or indirectly inputted therefrom via said adapter and further determining whether the inputted signal represents the command or the communication data so as to apply the command to the controlling unit and to allow the communication data to pass therethrough;

a digital data communication processing unit for encoding/decoding the input/output communication data and interpreting the command so as to apply the command to a controlling unit;

a first switching unit connected to the radio communication unit;

a second switching unit connected to the first switching unit, the digital data communication processing unit, and the data analyzing unit; and the controlling unit for, when the signal subjected to the data analyzing unit is determined to be the direct input from the information processing apparatus, responding to the command interpreted by the data analyzing unit to control the second switching unit for connection between the digital data communication processing unit and the data analyzing unit while responding to the command interpreted by the digital data communication processing unit to control the radio communication unit and the first switching unit for establishment of a data communication channel and for, when the signal subjected to the data analyzing unit is determined to be the indirect input via the adapter, responding to the command from the data analyzing unit to control the radio communication unit, the first switching unit and the second switching unit for direct connection between the first switching unit and the second switching unit thereby establishing a data communication channel.

4. The cellular telephone of claim 1, further comprising:

an operation unit for inputting a voice communication control signal in the controlling unit based on an operation by a user;

a voice input/output unit for carrying out voice communications; and a conversion unit interposed between the voice input/output unit and the switching unit and performing digital/analog conversion or analog/digital conversion on a signal to be inputted/outputted, wherein the controlling unit responds to the voice communication control signal inputted from the operation unit to control the radio communication unit and the switching unit for establishment of a voice communication channel, and responds to the command interpreted by the digital data communication processing unit to establish the data communication channel and then sustaining the data communication channel during the establishment thereof, despite an input of the voice communication control signal from the operation unit.

5. The cellular telephone of claim 2, further comprising:

an operation unit for inputting a voice communication control signal in the controlling unit based on an operation by a user;

a voice input/output unit for carrying out voice communications; and a conversion unit interposed between the voice input/output unit and the switching unit and performing digital/analog conversion or analog/digital conversion on a signal to be inputted/outputted, wherein the controlling unit responds to the voice communication control signal inputted from the operation unit to control the radio communication unit and the switching unit for establishment of a voice communication channel, and responds to the command from the digital data communication processing unit or the data judging unit to establish the data communication channel and then sustains the data communication channel during the establishment thereof, despite an input of the voice communication control signal from the operation unit.

6. The cellular telephone of claim 3, further comprising:
an operation unit for inputting a voice communication control signal in the controlling unit based on an operation by a user;
a voice input/output unit for carrying out voice communications; and
a conversion unit interposed between the voice input/output unit and the first switching unit, for performing digital/analog conversion or analog/digital conversion on a signal to be inputted/outputted,
wherein the controlling unit responds to the voice communication control signal inputted from the operation unit to control the radio communication unit and the first switching unit for establishment of a voice communication channel, and responds to the command from the data analyzing unit or the digital data communication processing unit to control the radio communication unit, the first switching unit and the second switching unit to establish the data communication channel, and then sustains the data communication channel during the establishment thereof despite an input of the voice communication control signal from the operation unit.

7. The cellular telephone of claim 4, further comprising:
a preference operation unit for inputting a priority signal in the controlling unit in response to an operation by a user,
wherein the controlling unit responds to the inputted priority signal to establish the voice communication channel based on the voice communication control signal from the operation unit, despite the command supplied thereto.

8. The cellular telephone of claim 5, further comprising:
a preference operation unit for inputting a priority signal in the controlling unit in response to an operation by a user,
wherein the controlling unit responds to the inputted priority signal to establish the voice communication channel based on the voice communication control signal from the operation unit, despite the command supplied thereto.

9. The cellular telephone of claim 6, further comprising:
a preference operation unit for inputting a priority signal in the controlling unit in response to an operation by a user,
wherein the controlling unit responds to the inputted priority signal to establish the voice communication channel based on the voice communication control signal from the operation unit, despite the command supplied thereto.

10. The cellular telephone of claim 1, further comprising:
voice circuitry for voice communication,
wherein the controlling unit controls the switching unit to couple either voice communication or data communication to/from the radio communication unit.

11. The cellular telephone of claim 10, wherein the voice circuitry comprises:
a voice input/output unit; and
a conversion unit for analog-to-digital and digital-to-analog conversions.

12. The cellular telephone of claim 1, further comprising:
an operation unit operable to input information to the controlling unit.

13. The cellular telephone of claim 12, wherein the controlling unit is disabled from responding to input from the operation unit during data communication.

14. The cellular telephone of claim 1, further comprising:
a preference operation unit operable to input a priority signal for switching from data communication to voice communication.

15. The cellular telephone of claim 2, further comprising:
voice circuitry for voice communication,
wherein the controlling unit controls the switching unit to couple either voice communication or data communication to/from the radio communication unit.

16. The cellular telephone of claim 15, wherein said voice circuitry comprises:
a voice input/output unit; and
a conversion unit for analog-to-digital and digital-to-analog conversions.

17. The cellular telephone of claim 15, wherein the switching unit comprises a first switching section and a second switching section,
the first switching section being connected to the voice circuitry and the second switching section, and
the second switching section being connected to the digital data communication processing unit and the data judging circuit.

18. The cellular telephone of claim 2, further comprising:
an operation unit operable to input information to the controlling unit.

19. The cellular telephone of claim 18, wherein the controlling unit is disabled from responding to input from the operation unit during data communication.

20. The cellular telephone of claim 2, further comprising:
a preference operation unit operable to input a priority signal for switching from data communication to voice communication.

21. The cellular telephone of claim 3, further comprising:
voice circuitry for voice communication,
wherein the controlling unit controls the first switching unit to couple either voice communication or data communication to/from the radio communication unit.

22. The cellular telephone of claim 21, wherein said voice circuitry comprises:
a voice input/output unit; and
a conversion unit for analog-to-digital and digital-to-analog conversions.

23. The cellular telephone of claim 3, further comprising:
an operation unit operable to input information to the controlling unit.

24. The cellular telephone of claim 23, wherein the controlling unit is disabled from responding to input from the operation unit during data communication.

25. The cellular telephone of claim 3, further comprising:
a preference operation unit operable to input a priority signal for switching from data communication to voice communication.

* * * * *

UNITED STATES PATENT AND TRADEMARK OFFICE
CERTIFICATE OF CORRECTION

PATENT NO. : 6,366,787 B1
DATED : April 2, 2002
INVENTOR(S) : Iwamoto

It is certified that error appears in the above-identified patent and that said Letters Patent is hereby corrected as shown below:

<u>Title page,</u>
Item [30], Foreign Application Priority Data, change "10-163738" to -- 10-163768 --.

Signed and Sealed this

Fifteenth Day of October, 2002

Attest:

Attesting Officer

JAMES E. ROGAN
*Director of the United States Patent and Trademark Office*